United States Patent [19]
Hunter et al.

[11] 3,764,623
[45] Oct. 9, 1973

[54] HERBICIDAL DINITRO-1,3-PHENYLENEDIAMINE COMPOUNDS

[75] Inventors: Don L. Hunter, Anaheim; William G. Woods, Fullerton; James D. Stone, Whittier; Cecil W. LeFevre, Orange, all of Calif.

[73] Assignee: United States Borax & Chemical Corporation, Los Angeles, Calif.

[22] Filed: Sept. 3, 1970

[21] Appl. No.: 69,487

Related U.S. Application Data

[60] Division of Ser. No. 875,508, Nov. 10, 1969, Pat. No. 3,617,252, which is a continuation-in-part of Ser. No. 812,307, April 1, 1969, abandoned.

[52] U.S. Cl............. 260/573, 260/326.85, 260/577
[51] Int. Cl............................................. C07c 87/58
[58] Field of Search............................ 260/573, 577

[56] References Cited
UNITED STATES PATENTS

| | | | |
|---|---|---|---|
| 3,591,638 | 7/1971 | Halasz | 260/577 |
| 3,111,403 | 11/1963 | Soper | 260/577 X |
| 3,466,329 | 9/1969 | Soper | 260/577 |
| 3,257,190 | 6/1966 | Soper | 260/577 |
| 3,332,769 | 7/1967 | Soper | 260/577 X |
| 3,442,639 | 5/1969 | Soper | 260/577 X |
| 3,546,295 | 12/1970 | Maravetz | 260/577 |

FOREIGN PATENTS OR APPLICATIONS

| | | | |
|---|---|---|---|
| 1,110,819 | 4/1968 | Great Britain | 260/573 |

*Primary Examiner*—Lewis Gotts
*Assistant Examiner*—C. F. Warren
*Attorney*—James R. Thornton

[57] ABSTRACT

2,4-dinitro-1,3-phenylenediamine compounds having a trifluoromethyl group on the aromatic ring. The compounds are useful as herbicides.

11 Claims, No Drawings

HERBICIDAL DINITRO-1,3-PHENYLENEDIAMINE COMPOUNDS

This application is a division of our co-pending application Ser. No. 875,508 filed Nov. 10, 1969, now U.S. Pat. No. 3,617,252 which in turn is a continuation-in-part of our co-pending application Ser. No. 812,307 filed Apr. 1, 1969, now abandoned.

This invention relates to novel trifluoromethyl-dinitro-1,3-phenylenediamine compounds and their use as herbicides. There is provided by this invention a class of 2,4-dinitro-N-substituted-1,3-phenylenediamine compounds having a trifluoromethyl substituent in the 6-position of the aromatic ring having outstanding herbicidal activity.

The novel compounds of this invention can be defined by the formula

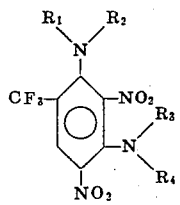

wherein $R_1$, $R_2$, $R_3$ and $R_4$ are each selected from hydrogen, alkyl, alkenyl, and alkynyl, with the proviso that at least one of said R's is a hydrocarbon group. Also, $R_1$-$R_2$ and/or $R_3$-$R_4$ can represent a portion of a cyclic group such as an alkylene chain to form a heterocyclic group containing carbon atoms in addition to the nitrogen atom which is the point of attachment to the aromatic ring.

For convenience in naming the compound, the amino nitrogen adjacent to the trifluoromethyl group is referred to as $N^1$ and the amino nitrogen between the nitro groups on the ring is referred to as $N^3$. Thus, the nitro substituents are in the 2 and 4 position of the aromatic ring and the trifluoromethyl group is in the 6 position of the aromatic ring. It will be noted from the above definition that either the $N^1$ or $N^3$ amino nitrogen must have at least one substituent thereon thereby excluding the unsubstituted compound having two amino (-$NH_2$) groups.

Typical examples of the groups represented by $R_1$, $R_2$, $R_3$ and $R_4$ as defined above are hydrogen and the lower alkyl, lower alkenyl, and lower alkynyl groups having up to about six carbon atoms, including the cyclic analogues thereof as well as the halo, hydroxy, and lower alkoxy substituted derivatives thereof. Representative groups are methyl, ethyl, n-propyl, iso-propyl, n-butyl, sec-butyl, n-pentyl, sec-pentyl, n-hexyl, allyl, 2-butenyl, 2-butynyl, 3-butynyl, methallyl, 2-pentynyl, 2-hydroxyethyl, 2-bromoethyl, 2-methoxyethyl, 3-ethoxypropyl, 2,2-dimethoxyethyl, 2-chloroallyl, 3-chloropropyl, 4-hydroxy-2-butynyl, 1-methyl-2-methoxyethyl, 2-bromoallyl, propynyl, 4-chloro-2-butenyl, 4-bromo-1-butenyl, 3-iodo-2-pentenyl, 4-chloro-2-butynyl, cyclohexyl, cyclopropyl, cyclobutyl, cyclohexenyl, and the like.

Furthermore, $R_1$-$R_2$ and/or $R_3$-$R_4$ can represent a fragment of a ring of which the amino nitrogen is a part thereof, such as illustrated by the structure

in which Z is an alkylene group having from about two to six carbon atoms in the chain, and optionally other atoms such as oxygen and nitrogen. Such linkages include the dimethylene, trimethylene, tetramethylene, diethyleneoxy, diethyleneimino, and hexamethylene groups.

A preferred class of compounds according to this invention are those in which $R_1$ is hydrogen, $R_2$ and $R_3$ are each selected from hydrogen and alkyl of one to five carbon atoms and $R_4$ is alkyl of one to five carbon atoms. Thus, representative examples of alkyl are methyl, ethyl, n-propyl, isopropyl, sec-butyl, sec-pentyl, and the like. Preferably the total number of carbon atoms represented by $R_1 + R_2 + R_3 + R_4$ is about four to eight. Compounds in which both $R_1$ and $R_2$ are hydrogen represent a further preferred class.

Representative examples of such preferred compounds are $N^1$-sec-butyl-$N^3$,$N^3$-dimethyl-2,4-dinitro-6-trifluoromethyl-1,3-phenylenediamine $N^1$-ethyl-$N^3$,$N^3$-diethyl-2,4-dinitro-6-trifluoromethyl-1,3-phenylenediamine $N^1$-methyl-$N^3$-sec-butyl-2,4-dinitro-6-trifluoromethyl-1,3-phenylenediamine $N^1$-ethyl-$N^3$-sec-butyl-2,4-dinitro-6-trifluoromethyl-1,3-phenylenediamine $N^1$-methyl-$N^3$,$N^3$-di-n-propyl-2,4-dinitro-6-trifluoromethyl-1,3-phenylenediamine $N^3$,$N^3$-di-n-propyl-2,4-dinitro-6-trifluoromethyl-1,3-phenylenediamine $N^1$-methyl-$N^3$,$N^3$-diethyl-2,4-dinitro-6-trifluoromethyl-1,3-phenylenediamine $N^1$-n-propyl-$N^3$,$N^3$-diethyl-2,4-dinitro-6-trifluoromethyl-1,3-phenylenediamine $N^1$-sec-pentyl-$N^3$,$N^3$-dimethyl-2,4-dinitro-6-trifluoromethyl-1,3-phenylenediamine $N^3$,$N^3$-diethyl-2,4-dinitro-6-trifluoromethyl-1,3-phenylenediamine $N^3$-(3-pentyl)-2,4-dinitro-6-trifluoromethyl-1,3-phenylenediamine $N^3$-sec-butyl-2,4-dinitro-6-trifluoromethyl-1,3-phenylenediamine $N^3$-(1-methyl-2-methoxyethyl)-2,4-dinitro-6-trifluoromethyl-1,3-phenylenediamine The compounds of this invention are either crystalline solids or high boiling liquids. Genrally they are only slightly soluble in water and are moderately soluble in the usual organic solvents such as ethanol, acetone, ether and benzene. The compounds are readily prepared by reaction of one or two amines or ammonia with a 2,4-dihalo-3,5-dinitrobenzotrifluoride according to the following equation:

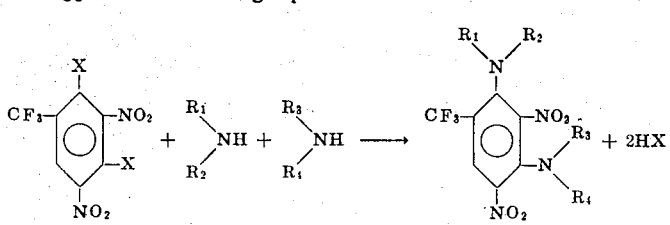

in which X is a reactive halogen such as chloride or bromine and $R_1$, $R_2$, $R_3$ and $R_4$ can have the significance previously assigned.

When $R_1$ and $R_2$ are the same as $R_3$ and $R_4$, that is when the substituted $N^1$ amino group is the same as the substituted $N^3$ amino group in the resultant product, the reaction takes place in one step using at least four moles of amine for each mole of 2,4-dihalo-3,5-dinitrobenzotrifluoride. When $R_1$ and $R_2$ are different from $R_3$ and $R_4$, the reaction requires two steps in which a different amine is employed in each step. In the first step about two moles of the amine forming the $N^3$ group is reacted with about one mole of the 2,4-dihalo-3,5-dinitrobenzotrifluoride. The first halogen atom replaced is that between the nitro groups on the aromatic ring. This step is advantageously carried out in a nonpolar solvent such as a hydrocarbon in which the amine hydrohalide is insoluble and can be removed by filtration. In the second step about two moles of the amine forming the $N^1$ group is reacted with the monoamino-substituted compound to form the unsymmetrically substituted 1,3-phenylenediamine compound. The second reaction can take place in a sealed reaction vessel, such as a sealed tube or an autoclave, to avoid losses of amine and provide easy control of the reaction, or at atmospheric pressure in the presence of a solvent, such as an alcohol, in which the amine is highly soluble. In the case of higher boiling amines it is not necessary to use a sealed reaction vessel for the reaction but it is sufficient merely to carry it out in the presence of a suitable solvent.

A reaction temperature in the range of from about 20° to about 100° C. preferably is employed to give good yields of the desired product and a satisfactory rate of reaction, both in the case of using a sealed reaction vessel and when the reactants are brought together in the presence of solvent. Hydrogen halide is formed as a by-product and, in the presence of excess amine, is converted to the amine hydrohalide which can be readily removed by washing with water or by filtration after dissolution of the product in a suitable solvent. The desired products can be purified by well known procedures such as by recrystallization.

The 2,4-dihalo-3,5-dinitrobenzotrifluoride starting materials are readily prepared by nitration of the 2,4-dihalobenzotrifluoride with a mixture of fuming nitric and fuming sulfuric acids at a temperature below about 80° C.

The following examples describe preparation of representative compounds of this invention, but it is to be understood that the invention is not to be limited to the specific examples given.

EXAMPLE I $N^1,N^3$-bis(diethyl)-2,4-dinitro-6-trifluoromethyl-1,3-phenylenediamine A heavy walled glass reaction tube of about 50 ml. capacity was charged with 5 grams (0.0163 mole) of 2,4-dichloro-3,5-dinitrobenzotrifluoride, 30 ml. of ethanol and 20 ml. of diethylamine. The reaction tube was sealed and heated in a bath at 94°–99° C. for 46.5 hours. The cooled reaction tube was then opened and the contents evaporated to dryness to give a solid residue. The residue was extracted with 200 ml. of refluxing diethyl ether and the insoluble amine hydrochloride was separated therefrom by filtration. The ether extract was evaporated to dryness and the residue dissolved in 40 ml. of refluxing 95% ethanol and 10 ml. of water. Upon cooling, the product crystallized and was isolated by filtration, obtaining the desired product (30% yield) as a crystalline solid, melting at 72.5°–74.5° C. After recrystallization, the product melts at 74°–75° C.

Analysis:
Calculated: C, 47.61; H, 5.60; N, 14.81
Found: C, 47.34; H, 5.58; N, 14.64

EXAMPLE II $N^1,N^3$-bis(dimethyl)-2,4-dinitro-6-trifluoromethyl-1,3-phenylenediamine This compound was prepared in a similar manner by reaction of 2,4-dichloro-3,5-dinitrobenzotrifluoride with dimethylamine. The crystalline product melts at 125.5°–126.5° C.

Analysis:
Calculated: C, 41.00; H, 4.07; N, 17.39
Found: C, 40.91; H, 4.01; N, 17.54

EXAMPLE III $N^1,N^3$-bis(di-n-propyl)-2,4-dinitro-6-trifluoromethyl-1,3-phenylenediamine This compound was prepared in a similar manner by reaction of 2,4-dichloro-3,5-dinitrobenzotrifluoride with di-n-propylamine. The product is a high boiling oil.

EXAMPLE IV $N^1,N^3$-di-sec-butyl-2,4-dinitro-6-trifluoromethyl-1,3-phenylenediamine To a stirred solution of 5.00 grams (0.0164 mole) of 2,4-dichloro-3,5-dinitrobenzotrifluoride in 25 ml. of absolute ethanol and 10 ml. of dioxane was added 5.04 grams (0.069 mole) of sec-butylamine. The resultant mixture was stirred under reflux for 24 hours. The solvent was then removed by evaporation under reduced pressure and the residue dissolved in 75 ml. of chloroform. The chloroform solution was extracted thrice with 75 ml. of water and dried over sodium sulfate. The solvent was removed by distillation, the residue dissolved in ethanol and the ethanol solution decolorized with activated carbon. The ethanol was distilled off under reduced pressure and the residue extracted with boiling n-hexane. The hexane solution was cooled to 0° C., bringing down an oil from which the hexane was decanted to give 60.7% yield of the product as a clear amber oil.

Analysis:
Calculated: N = 14.80
Found: N = 15.37

EXAMPLES V – XIV

The following compounds were prepared in a similar manner by reaction of 2,4-dichloro-3,5-dinitrobenzotrifluoride with the corresponding amine.

V—$N^1,N^3$-dimethyl-2,4-dinitro-6-trifluoromethyl-1,3-phenylenediamine; m.p. 169°–170° C.

VI—$N^1,N^3$-diisopropyl-2,4-dinitro-6-trifluoromethyl-1,3-phenylenediamine; m.p. 66.5°–67.5° C.

VII—$N^1,N^3$-di(2-chloroallyl)-2,4-dinitro-6-trifluoromethyl-1,3-phenylenediamine, m.p. 82.5°–83.5° C.

VIII—$N^1,N^3$di(2-methoxyethyl)-2,4-dinitro-6-trifluoromethyl-1,3-phenylenediamine; m.p. 98°–99° C.

IX—$N^1,N^3$-diallyl-2,4-dinitro-6-trifluoromethyl-1,3-phenylenediamine; m.p. 79°–80° C.

X—$N^1,N^3$-di(3-methoxypropyl)-2,4-dinitro-6-trifluoromethyl-1,3-phenylenediamine; oil XI—$N^1,N^3$-diethyl-2,4-dinitro-6-trifluoromethyl-1,3-phenylenediamine; m.p. 96°–97° C.

XII—$N^1,N^3$-dicyclohexyl-2,4-dinitro-6-trifluoromethyl-1,3-phenylenediamine; m.p. 107.5°–108° C.

XIII—$N^1,N^1,N^3,N^3$-di(tetramethylene)-2,4-dinitro-6-trifluoromethyl-1,3-phenylenediamine; m.p. 164°–164.5° C.

XIV—$N^1,N^1,N^3,N^3$-di(pentamethylene)-2,4-dinitro-6-trifluoromethyl-1,3-phenylenediamine; m.p. 139°–140° C.

EXAMPLE XV

N,N-di-n-propyl-3-chloro-2,6-dinitro-4-trifluoromethylaniline

A heavy walled glass reaction tube of approximately 50 ml. capacity was charged with 7.0 grams (0.023 mole) of 2,4-dichloro-3,5-dinitrobenzotrifluoride, 4.64 grams (0.0458 mole) of di-n-propylamine and 40 ml. of absolute ethanol. The tube was sealed and heated in an oil bath at 94°–99° C. for 98 hours. The cooled reaction mixture was then evaporated to dryness to give an oily residue which was extracted with boiling diethyl ether. The insoluble di-n-propylamine hydrochloride was removed by filtration and washed with additional ether. The combined ether filtrates were evaporated to give an oily orange residue which was dissolved in 100 ml. of absolute ethanol and decolorized with activated charcoal. The ethanol and volatiles were removed by evaporation under reduced pressure to give the product (6.77 grams) as a viscous reddish oil.

$N^3,N^3$-di-n-propyl-2,4-dinitro-6-trifluoromethyl-1,3-phenylenediamine

A glass reaction tube was charged with 4.0 grams (0.0108 mole) of N,N-di-n-propyl-3-chloro-2,6-dinitro-4-trifluoromethylaniline, 5.82 grams (0.0237 mole) of 6.95% ethanolic ammonia and 35 ml. of ethanol. The tube was sealed and heated in an oven at 100° C. for 68 hours. The contents of the tube were cooled and the ethanol removed by evaporation. Water was added to the solid orange residue to dissolve the ammonium chloride and the insoluble product was separated by filtration. The product was dissolved in refluxing 95% ethanol. Upon cooling, orange needles and a yellow powder crystallized. The yellow powder was identified as 2,4-dinitro-6-trifluoromethyl-1,3-phenylenediamine and was separated from the desired product by filtration after extraction with boiling hexane. The desired product dissolved in the hexane and was isolated from the filtrate by evaporation of the hexane. The residue was recrystallized from 95% ethanol to give orange needles, m.p. 124°–125° C.

Analysis:
  Calculated: N = 15.99
  Found: N = 16.00

EXAMPLE XVI $N^1,N^1$-dimethylene-$N^3,N^3$-di-n-propyl-2,4-dinitro-6-trifluoromethyl-1,3-phenylenediamine A solution of 4 grams (0.0108 mole) of N,N-di-n-propyl-3-chloro-2,6-dinitro-4-trifluoromethylaniline and 0.93 grams (0.0216 mole) of ethyleneimine in 50 ml. of absolute ethanol was stirred overnight at 35° C. The solvent was removed by evaporation under reduced pressure to give a residue which was extracted with boiling hexane. The hexane extract was evaporated to dryness and the residue dissolved in absolute ethanol. After decolorizing with charcoal, the ethanol and volatiles were removed by evaporization under reduced pressure to give the product as a viscous amber oil, which was identified by its proton nuclear magnetic resonance spectrum.

EXAMPLE XVII $N^1$-ethyl-$N^3,N^3$-dimethyl-2,4-dinitro-6-trifluoromethyl-1,3-phenylenediamine N,N-dimethyl-3-chloro-2,6-dinitro-4-trifluoromethylaniline was reacted with ethylamine in a sealed tube as described in Example XV to give the desired product melting at 51.5°–52.5° C.

Representative examples of the many other compounds which can be prepared by the above-described general procedures are:

$N^1$-ethyl-$N^3$-sec-butyl-2,4-dinitro-6-trifluoromethyl-1,3-phenylenediamine; m.p. 92.5°–94° C.

$N^1$-sec-butyl-$N^3,N^3$-dimethyl-2,4-dinitro-6-trifluoromethyl-1,3-phenylenediamine; oil $N^1$-sec-butyl-$N^3,N^3$-diethyl-2,4-dinitro-6-trifluoromethyl-1,3-phenylenediamine; oil.

$N^1$-methyl-$N^3,N^3$-diethyl-2,4-dinitro-6-trifluoromethyl-1,3-phenylenediamine; m.p. 71.5°–73.5° C.

$N^1$-methyl-$N^3,N^3$-di-n-propyl-2,4-dinitro-6-trifluoromethyl-1,3-phenylenediamine; m.p. 48.5°–50.5° C.

$N^1,N^1$-di-n-propyl-$N^3,N^3$-dimethyl-2,4-dinitro-6-trifluoromethyl-1,3-phenylenediamine; m.p. 39.5°–40.5° C.

$N^1$-ethyl-$N^3,N^3$-diethyl-2,4-dinitro-6-trifluoromethyl-1,3-phenylenediamine; 54°–55.5° C.

$N^1,N^1$-diethyl-$N^3,N^3$-dimethyl-2,4-dinitro-6-trifluoromethyl-1,3-phenylenediamine; m.p. 45°–46° C.

$N^1$-methyl-$N^3$-sec-butyl-2,4-dinitro-6-trifluoromethyl-1,3-phenylenediamine; m.p. 81°–83° C.

$N^1,N^1$-diemthylene-$N^3$-sec-butyl-2,4-dinitro-6-trifluoromethyl-1,3-phenylenediamine; m.p. 92°–93° C.

$N^1$-propargyl-$N^3,N^3$-di-n-propyl-2,4-dinitro-6-trifluoromethyl-1,3-phenylenediamine; oil $N^1$-propargyl-$N^3 N^3$-diethyl-2,4-dinitro-6-trifluoromethyl-1,3-phenylenediamine; oil $N^1,N^1$-diethyl-$N^3$-ethyl-2,4-dinitro-6-trifluoromethyl-1,3-phenylenediamine; m.p. 64.5°–65.5° C.

$N^1$-propargyl-$N^3$-sec-butyl-2,4-dinitro-6-trifluoromethyl-1,3-phenylenediamine; m.p. 53°–54° C.

$N^1,N^1$-dimethyl-$N^3,N^3$-di-n-propyl-2,4-dinitro-6-trifluoro-methyl-1,3-phenylenediamine; m.p. 58.5°–59.5° C.

$N^1,N^1$-dimethyl-$N^3,N^3$-diethyl-2,4-dinitro-6-trifluoromethyl-1,3-phenylenediamine; m.p. 114°–116° C.

$N^1,N^1$-diethyl-$N^3$-sec-butyl-2,4-dinitro-6-trifluoromethyl-1,3-phenylenediamine; oil $N^1$-ethyl-$N^3,N^3$-di-n-propyl-2,4-dinitro-6-trifluoromethyl-1,3-phenylenediamine; oil $N^1,N^1$-dimethylene-$N^3,N^3$-diethyl-2,4-dinitro-6-trifluoromethyl-1,3-phenylenediamine; oil $N^1$-propargyl-$N^3$,$N^3$-dimethyl-2,4-dinitro-6-trifluoromethyl-1,3-phenylenediamine; m.p. 66°–67° C.

$N^1$-(2-hydroxyethyl)-$N^3$-sec-butyl-2,4-dinitro-6-trifluoromethyl-1,3-phenylenediamine; m.p. 57.5°–58.5° C.

$N^3$-cyclopentyl-$N^3$-methyl-2,4-dinitro-6-trifluoromethyl-1,3-phenylenediamine; m.p. 87°–88.5° C.

$N^3$-(1-methyl-2-methoxyethyl)-2,4-dinitro-6-trifluoromethyl-1,3-phenylenediamine; m.p. 120.5°–121.5° C.

$N^3$-(2,2-dimethoxyethyl)-2,4-dinitro-6-trifluoromethyl-1,3-phenylenediamine; m.p. 137°–139° C.

$N^3$-(3-chloropropyl)-2,4-dinitro-6-trifluoromethyl-1,3-phenylenediamine; m.p. 94°–94.5° C.

$N^3$-(2-bromoethyl)-2,4-dinitro-6-trifluoromethyl-1,3-phenylenediamine; m.p. 149°–150° C.

$N^3$,$N^3$-bis(2-methoxyethyl)-2,4-dinitro-6-trifluoromethyl-1,3-phenylenediamine; m.p. 93°–94° C.

$N^3$-cyclopropyl-2,4-dinitro-6-trifluoromethyl-1,3-phenylenediamine; m.p. 180°–181.5° C.

$N^1$-methyl-$N^3$-(3-pentyl)-2,4-dinitro-6-trifluoromethyl-1,3-phenylenediamine; m.p. 73.5°–74.5° C.

$N^3$-sec-amyl-2,4-dinitro-6-trifluoromethyl-1,3-phenylenediamine; m.p. 105.5°–106.5° C.

$N^1$-methyl-$N^3$,$N^3$-diethyleneoxy-2,4-dinitro-6-trifluoromethyl-1,3-phenylenediamine; m.p. 201°–203° C.

$N^3$-methyl-$N^3$-ethyl-2,4-dinitro-6-trifluoromethyl-1,3-phenylenediamine; m.p. 89°–89.5° C.

$N^3$,$N^3$-diallyl-2,4-dinitro-6-trifluoromethyl-1,3-phenylenediamine; m.p. 72°–73° C.

$N^1$-methyl-$N^3N^3$-pentamethylene-2,4-dinitro-6-trifluoromethyl-1,3-phenylenediamine; m.p. 112.5°–113.5° C.

$N^3$-(3-pentyl)-2,4dinitro-6-trifluoromethyl-1,3-phenylenediamine; m.p. 119.5°–120.5° C.

$N^1$-methyl-$N^3$-cyclohexyl-2,4-dinitro-6-trifluoromethyl-1,3-phenylenediamine; m.p. 127.5°–128.5° C.

$N^3$-(2-chloroallyl)-2,4-dinitro-6-trifluoromethyl-1,3-phenylenediamine; m.p. 102°–103° C.

$N^3$-sec-butyl-2,4-dinitro-6-trifluoromethyl-1,3-phenylenediamine; m.p. 126.5°–127.5° C.

$N^3N^3$-diethyl-2,4-dinitro-6-trifluoromethyl-1,3-phenylenediamine; m.p. 98°–99° C.

$N^1$,$N^1$-diethyl-2,4-dinitro-6-trifluoromethyl-1,3-phenylenediamine; m.p. 85°–86° C.

$N^1$,$N^1$-di-n-propyl-2,4-dinitro-6-trifluoromethyl-1,3-phenylenediamine; m.p. 75.5°–76.5° C.

$N^1$-sec-butyl-2,4-dinitro-6-trifluoromethyl-1,3-phenylenediamine; m.p. 58°–60° C.

The following example illustrates a typical preparation of the 2,4-dihalo-3,5-dinitrobenzotrifluoride intermediates.

EXAMPLE XVIII 2,4-dichloro-3,5-dinitrobenzotrifluoride

Fuming sulfuric acid (600 ml.) containing 30–33% free $SO_3$ was stirred in a two-liter, three-necked flask immersed in an ice bath. Fuming 90% nitric acid (585 ml.) was added followed by 148.8 grams (0.692 mole) of 2,4-dichlorobenzotrifluoride. This stirred slurry then was heated to 76° C. and held at 76°±1° C. for 96 hours. The mixture was cooled and the acid was drained from the crust of crystalline product. Water (1000 ml) was added to the broken up solid and the stirred slurry extracted with 500 ml. of toluene. The toluene solution with another 500 ml. of toluene added was washed successively with water (500 ml.), twice with 500 ml. of 5% sodium bicarbonate solution, and finally ith water (500 ml.). Removal of the toluene by evaporation at reduced pressure and drying overnight gave 166.6 grams (79%) of the desired with -dichloro-3,5-dinitrobenzotrifluoride, m.p. 67°–72° C. After recrystallization from ethanol the material melts at 74°–75° C.

Reference is made to a copending application of Don L. Hunter, Ser. No. 832,860 filed June 12, 1969, now U.S. Pat. No. 3,586,725 which describes and claims preparation of the 2,4-dihalo-3,5-dinitrobenzotrifluorides.

The compounds of this invention are excellent herbicides and are especially useful as selective herbicides for controlling weeds in the presence of desirable crops, especially the grassy weeds such as, for example, foxtail, water grass, and crabgrass. Many of the compounds of this invention may be used in controlling weeds in desirable grassy crops such as corn and rice, as well as the small grains, and also the broad leaf crops such as cotton and soy beans. Also, many of the preferred compounds are effective in controlling wild oats which constitute a major problem in small grain crops wuch as wheat and barley.

Water grass and related weeds are a serious problem in rice and the discovery of an effective selective herbicide for this problem is a significant advancement in the art. Such a discovery is surprising and unexpected in view of the phytotoxicigy of many other aromatic amine derivatives to grassy crops such as rice. It has also been found that the specific phenylenediamines of this invention are much less volatile than many other substituted aromatic amines and will move better in the soil, as well as possessing better ultraviolet stability.

The compounds can be applied as both a pre-emergence or a post-emergence treatment; that is they can be applied to soil in which the weeds will grow or they can be used to kill or suppress the growth of weeds or to kill or prevent the emergence of seedlings of undesirable plants. Thus, the compounds can be used to control the growth of weeds by applying a phytotoxic amount of one or more of the active compounds of this invention to the locus to be protected, that is, soil in which the weeds are growing or will grow or the foliage of the growing plants. "Weeds" as used herein is meant to include any plant growth which is undesirable.

Generally an application rate of from about 0.1 to about 25 pounds of one or more of the active compounds per acre is effective in controlling plant growth. Preferably an application rate of from about 0.25 to about 5 pounds per acre is employed. At such rates the undesirable weeds are killed or stunted with little or no injury to desirable crops.

The following examples illustrate the herbicidal activity of typical compounds of this invention.

EXAMPLE XIX

The compounds to be tested were evaluated as pre-emergence herbicides on a broad class of representative weeds and crops. Greenhouse flats were planted to pigweed, cheat, wild oats, foxtail, morning-glory, water grass, rice, sugar beets, cotton, corn, barley, and soybeans. On the same day of planting the flats were sprayed with an ethanol solution of the compound to be tested at a rate of 2 pounds per acre. The flats were kept in the greenhouse and watered when needed. 21 days after treatment, the plants were evaluated for herbicidal activity and rated on a 0 to 9 scale in which 0 = no effect; 5 = substantial injury with slight kill and 9 = complete kill. The following results were obtained.

TABLE I

| Compound (DTP=2,4-dinitro-6-trifluoromethyl-1,3-phenylenediamine) | Activity* | | | | | | | | | | | |
|---|---|---|---|---|---|---|---|---|---|---|---|---|
| | P | CH | WO | F | M | W | R | SB | CO | CR | B | SO |
| $N^1$-ethyl-$N^3$-sec-butyl-DTP | 9 | 0 | 5 | 9 | 0 | 9 | 0 | 4 | 3 | 1 | 0 | 0 |
| $N^1$-methyl-$N^3$-sec-butyl-DTP | 9 | 1 | 8 | 9 | 1 | 9 | 0 | 4 | 1 | 4 | 0 | 1 |
| $N^1,N^1$-dimethyl-$N^3,N^3$-diethyl-DTP | 9 | 1 | 2 | 7 | 0 | 9 | 0 | 3 | 0 | 0 | 0 | 0 |
| $N^1$-sec-butyl-$N^3,N^3$-dimethyl-DTP | 9 | 3 | 8 | 9 | 1 | 9 | 0 | 1 | 0 | 1 | 1 | 1 |
| $N^1$-sec-butyl-$N^3,N^3$-diethyl-DTP | 2 | 0 | 3 | 9 | 0 | 7 | 0 | 0 | 0 | 0 | 1 | 0 |
| $N^1,N^1$-dimethylene-$N^3,N^3$-di-n-propyl-DTP | 8 | 1 | 5 | 6 | 0 | 4 | 0 | 1 | 1 | 0 | 0 | 0 |

*P=pigweed; CH=cheat; WO=wild oats; F=foxtail; M=morning-glory; W=water grass; R=rice; SB=sugar beets; CO=cotton; CR=corn; B=barley; SO=soybeans.

EXAMPLE XX

The compounds to be tested were evaluated as both a pre-emergence and post-emergence treatment on a broad class of weeds and crops. Greenhouse flats were planted to the species tested in Example XIX and the flats sprayed on the same day as planting with an ethanol solution of the compound to be tested at a rante of 2 pounds per acre.

Another set of flats with the same plants was treated after the plants had eMerged and were about 1 inch in height. These flats were also sprayed with an ethanol solution of the compound at a rate of 2 pounds per acre in order to determine post-emergence activity. The flats were kept in the greenhouse and watered when needed. 22 days after treatment the flats were evaluated and rated as described in Example XIX. The following results were obtained.

TABLE II

| Plant specie | Compound A | | Compound B | | Compound C | |
|---|---|---|---|---|---|---|
| | Pre | Post | Pre | Post | Pre | Post |
| Pigweed | 8 | 4 | 9 | 4 | 8 | 3 |
| Cheat | 2 | 2 | 3 | 0 | 3 | 2 |
| Wild oats | 9 | 3 | 9 | 3 | 9 | 3 |
| Foxtail | 9 | 8 | 9 | 8 | 9 | 5 |
| Morning-glory | 0 | 3 | 4 | 4 | 0 | 3 |
| Water grass | 9 | 8 | 9 | 9 | 9 | 7 |
| Rice | 0 | 0 | 0 | 0 | 0 | 0 |
| Sugar beets | 6 | 1 | 9 | 4 | 2 | 1 |
| Cotton | 0 | 6 | 4 | 4 | 0 | 3 |
| Corn | 0 | 0 | 4 | 2 | 0 | 0 |
| Barley | 0 | 0 | 1 | 0 | 0 | 1 |
| Soybeans | 0 | 3 | 3 | 4 | 0 | 3 |

Compound A = $N^1$-methyl-$N^3,N^3$-di-n-propyl-2,4-dinitro-6-trifluoromethyl-1,3-phenylenediamine Compound B = $N^3,N^3$-di-n-propyl-2,4-dinitro-6-trifluoromethyl-1,3-phenylenediamine Compound C = $N^1$-methyl-$N^3,N^3$-diethyl-2,4-dinitro-6-trifluoromethyl-1,3-phenylenediamine

EXAMPLE XXI

Greenhouse flats were planted to pigweed, crabgrass, wild oats, giant foxtail, sorghum, water grass, rice, Johnson grass, cotton, corn, barley, and soybeans. On the same day as planting, the flats were sprayed with an ethanol solution of the compound to be tested at a rate of 1 pound per acre. The flats were kept in the greenhouse and watered when needed. 16 days after treatment the flats were evaluated and the herbicidal activity rated as described in Example XIX. The following results were obtained.

TABLE III

| Compound (DTP=2,4-dinitro-6-trifluoromethyl-1,3-phenylenediamine) | Activity* | | | | | | | | | | | |
|---|---|---|---|---|---|---|---|---|---|---|---|---|
| | P | CB | WO | F | SG | W | R | JG | CO | CR | B | SO |
| $N^1,N^3$-diethyl-DTP | 4 | 5 | 1 | 3 | 3 | 2 | 0 | 4 | 1 | 0 | 0 | 0 |
| $N^1,N^3$-diallyl-DTP | 0 | 2 | 1 | 2 | 0 | 1 | 0 | 2 | 0 | 0 | 0 | 0 |
| $N^1,N^3$-di-n-propyl-DTP | 0 | 5 | 2 | 7 | 1 | 3 | 0 | 5 | 1 | 0 | 0 | 1 |
| $N^1$-ethyl-$N^3,N^3$-diethyl-DTP | 5 | 6 | 4 | 8 | 0 | 8 | 0 | 5 | 0 | 0 | 0 | 0 |
| $N^1$-ethyl-$N^3,N^3$-di-n-propyl-DTP | 3 | 5 | 5 | 7 | 0 | 6 | 0 | 5 | 0 | 0 | 0 | 0 |

*P=pigweed; CB=crabgrass; WO=wild oats; F=foxtail; SG=sorghum; W=water grass; R=rice; JG=Johnson grass; CO=cotton; CR=corn; B=barley; SO=soybean.

EXAMPLE XXII

Greenhouse flats were planted to soybeans, velvetleaf, oats, and millet. On the same day as planting the flats were sprayed with an ethanol solution of the compound to be tested at a rate of 5 pounds per acre. The flats were kept in the greenhouse and watered when needed. 19 to 21 days after treatment the flats were examined and the plants rated for herbicidal activity as described in Example XIX. The following results were obtained.

TABLE IV

| Compound (DTP=2,4-dinitro-6-trifluoromethyl-1,3-phenylenediamine) | Activity* | | | |
|---|---|---|---|---|
| | SO | VL | O | MI |
| $N^1,N^1$-dimethylene-$N^3$-sec-butyl-DTP | 0 | 1 | 3 | 9 |
| $N^1,N^1$-dimethylene-$N^3,N^3$-diethyl-DTP | 0 | 0 | 1 | 9 |
| $N^1$-propargyl-$N^3$-sec-butyl-DTP | 0 | 2 | 3 | 8 |
| $N^1$-propargyl-$N^3,N^3$-diethyl-DTP | 2 | 3 | 5 | 9 |
| $N^1$-propargyl-$N^3,N^3$-di-n-propyl-DTP | 1 | 1 | 6 | 9 |
| $N^3$-cyclopentyl-$N^3$-methyl-DTP | 0 | 4 | 5 | 9 |
| $N^3$-allyl-DTP | 2 | 4 | 4 | 9 |
| $N^3$-(3-chloropropyl)-DTP | 0 | 4 | 3 | 9 |
| $N^3$-(2-chloroallyl)-DTP | 0 | 3 | 2 | 9 |
| $N^3,N^3$-bis(2-methoxyethyl)-DTP | 4 | 5 | 6 | 9 |
| $N^3$-(1-methyl-2-methoxyethyl)-DTP | 4 | 5 | 9 | 9 |
| $N^3$-(2-bromoethyl)-DTP | 0 | 2 | 0 | 8 |
| $N^3$-isobutyl-DTP | 2 | 8 | 5 | 9 |
| $N^3$-sec-amyl-DTP | 4 | 8 | 9 | 9 |
| $N^3$-(3-pentyl)-DTP | 4 | 7 | 8 | 9 |
| $N^3$-sec-butyl-DTP | 4 | 7 | 8 | 9 |
| $N^3,N^3$-diethyl-DTP | 5 | 7 | 8 | 9 |
| $N^1$-methyl-$N^3,N^3$-pentamethylene-DTP | 0 | 0 | 2 | 9 |
| $N^1$-methyl-$N^3$-(3-pentyl)-DTP | 3 | 6 | 5 | 9 |
| $N^1,N_1$-diethyl-DTP | 3 | 4 | 8 | 9 |
| $N^1$-sec-butyl-DTP | 3 | 4 | 9 | 9 |
| $N^1$-(2-hydroxyethyl)-$N^3$-sec-butyl-DTP | 0 | 0 | 4 | 9 |

*SO=soybeans; VL=velvetleaf; O=oats; MI=millet.

EXAMPLE XXIII $N^3$-(1-methyl-2-methoxyethyl)-2,4-dinitro-6-trifluoromethyl-1,3-phenylenediamine is especially useful for controlling weeds in corn and cotton. For example, an ethanol solution of the compound was applied to soil at a rate of 0.25 pound per acre and then incorporated by mixing in a greenhouse flat. On the same day, foxtail, wild oats, millet, watergrass, crabgrass, pigweed, velvet leaf and corn were planted in the mixed treated soil. The flats were kept in the greenhouse and watered when needed. 14 days after treatment the flats were examined and the plants rated for herbicidal activity, as described in Example XIX. The following results were obtained.

TABLE V

| Plant Specie | Activity Rating |
|---|---|
| Foxtail | 8 |
| Wild oats | 8 |
| Millet | 9 |
| Water grass | 9 |
| Crabgrass | 9 |
| Pigweed | 9 |
| Velvet leaf | 5 |
| Corn | 0 |
| Cotton | 0 |

Since a relatively small amount of One or more of the active 2,4-dinitro-1,3-phenylenediamines should be uniformly distributed over the area to be treated, the compounds preferably are formulated with conventional herbicide carriers, either liquid or solid. Thus, the compounds can be impregnated on or admixed with a pulverulent solid carrier such as lime, talc, clay, Bentonite, calcium chloride, vermiculite, calcium carbonate, and the like. Alternatively, the compounds can be dissolved or suspended in a liquid carrier such as water, kerosene, alcohols, diesel oil, xylene, benzene, glycols, ketones, and the like. A surfactant preferably is included to aid in dispersion, emulsification and coverage. The surfactant can be ionic or non-ionic, and may be liquid or a solid. The use of the term "surfactant" herein is intended to include such compounds commonly referred to as wetting agents, dispersing agents and emulsifying agents. Typical surfactants include the alkylaryl-sulfonates, the fatty alcohol sulfates, sodium salt of naphthalene-sulfonic acid, alkylaryl polyether alcohols, long chain quaternary ammonium compounds, sodium salts of petroleum-derived alkylsulfonic acids, polyoxyethylene-sorbitan monolaurate, and the like. These dispersing and wetting agents are sold under numerous trademarks and may either be pure compounds, mixtures of compounds of the same general group, or they can be mixtures of compounds of different classes. Surfactants can also be included in compositions containing a solid inert carrier.

Concentrated compositions containing the active agent which can be subsequently diluted, as with water, to the desired concentration for application to plants and soil are also provided. The advantages of such concentrates are that they are prepared by the manufacturer in a form such that the user need only mix them with a locally available carrier, preferably water, thereby keeping shipping costs to a minimum while providing a product which can be used with a minimum of equipment and effort. Such concentrates may contain from about 5 to about 99 percent by weight of one or more of the active 2,4-dinitro-1,3-pheynlenediamines with a carrier or diluent, which may be a liquid or a solid. Liquid carriers which are miscible with the active agent or other liquids in which the compound may be suspended or dispersed can be used. A surfactant is also generally included to facilitate such dilution or dispersion in water. However, the surfactant itself may comprise the carrier in such concentrates.

The herbicidal compositions can include other beficial adjuvants, such as humectants, oils and contact agents. Also, other herbicides such as the sodium borates, sodium chlorate, chlorophenoxyacetic acids, substituted uracils and ureas, triazines, benzimidazoles, carbamates, anilides, amides, and haloalkanoic acids, can be included in the formulation.

The following examples are presented to illustrate the preparation of suitable herbicidal compositions of this invention.

EXAMPLE XXIV

5% $N^1$-propargyl-$N^3$,$N^3$-dimethyl-2,4-dinitro-6-trifluoromethyl-1,3-phenylenediamine (powdered)
95% Granular clay A granular formulation can be prepared by dry blending the above constituents until uniformly mixed in a rotary mixer. A fine spray of water is sprayed onto the mixture, while tumbling, to adhere the compound to the clay. The material is then air dried while tumbling to give a granular formulation which can be applied to the soil or vegetation by hand or by a mechanical spreader.

EXAMPLE XXV

85% $N^3$, $N^3$-di-n-propyl-2,4-dinitro-6-trifluoromethyl-1,3-phenylenediamine
14% Bentonite clay
1% Sodium lauryl sulfate surfactant A wettable powder formulation can be prepared by micronizing the 2,4-dinitro-1,3-phenylenediamine and mixing uniformly with powdered Bentonite clay and powdered sodium lauryl sulfate. The wettable powder can be added to water or hydrocarbon oil and mechanically agitated to insure a uniform dispersion which can be sprayed with conventional equipment onto sOil or vegetation.

EXAMPLE XXVI

25% $N^1$-ethyl-$N^3$,$N^3$-diethyl-2,4-dinitro-6-trifluoromethyl-1,3-phenylenediamine
5% Aromatic sulfonate-oxide condensate surfactant
70% Xylene The 2,4-dinitro-1,3-phenylenediamine is dissolved in xylene to form a concentrated solution. The emulsifying agent is then dissolved and a liquid formulation of an emulsifiable concentrate is obtained. The emulsifiable concentrate can be added to water to dilute it to a desired concentration, and then sprayed with conventional equipment onto soil or vegetation.

Various changes and modifications of the inventuon can be made, and, to the extent that such variations incorporate the spirit of this invention, they are intended to be included within the scope of the appended claims.

What is claimed is:

1. A compound of the formula

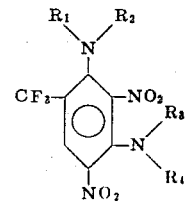

wherein $R_1$, $R_2$, $R_3$ and $R_4$ are each selected from hydrogen, lower alkyl, lower alkenyl, lower alkynyl, cyclo lower alkyl and cyclo lower alkenyl groups, said groups other then hydrogen being unsubstituted or having chloro, bromo, iodo, hydroxy or lower alkoxy substituents, at least one of the amino nitrogens being substituted.

2. A compound according to claim 1 in which $R_1$ is hydrogen, $R_2$ and $R_3$ are each selected from hydrogen and alkyl of one to five carbon atoms, and $R_4$ is alkyl of one to Five carbon atoms.

3. A compound according to claim 2 in which the total number of carbon atoms represented by $R_1 + R_2 + R_3 + R_4$ is about four to eight.

4. A compound according to claim 2 in which $R_1$ and $R_2$ are hydrogen, $R_3$ is hydrogen or alkyl of one to five carbon atoms and $R_4$ is alkyl of one to five carbon atoms.

5. $N^3,N^3$-diethyl-2,4-dinitro-6-trifluoromethyl-1,3-phenylenediamine.

6. $N^3$-(1-methyl-2-methoxyethyl)-2,4-dinitro-6-trifluoromethyl-1,3-phenylenediamine.

7. $N^1$-ethyl-$N^3,N^3$-diethyl-2,4-dinitro-6-trifluoromethyl-1,3-phenylenediamine.

8. $N^3,N^3$-di-n-propyl-2,4-dinitro-6-trifluoromethyl-1,3-phenylenediamine.

9. $N^1$-methyl-$N^3,N^3$diethyl-2,4-dinitro-6-trifluoromethyl-1,3-phenylenediamine.

10. $N^1,N^1$-di-n-propyl-2,4-dinitro-6-trifluoromethyl-1,3-phenylenediamine.

11. $N^3$-(3-pentyl)-2,4-dinitro-6-trifluoromethyl-1,3-phenylenediamine.

* * * * *

UNITED STATES PATENT OFFICE
CERTIFICATE OF CORRECTION

Patent No. 3,764,623                     Dated October 9, 1973

Inventor(s) Don L. Hunter, William G. Woods, James D. Stone
and Cecil W. LeFevre It is certified that error appears in the above-identified patent and that said Letters Patent are hereby corrected as shown below:

In Column 2, line 34 delete ",N3" and add --,$N^3$--;

In Column 8, line 11 delete "with" and add --2,4--;

In Column 8, line 30 delete "wuch" and add --such--;

In Column 9, line 41 delete "eMerged" and add --emerged--;

In Column 11, line 26 delete "One" and add --one--;

In Column 12, line 40 delete "sOil" and add --soil--;

In Column 13, line 12 delete "Five" and add --five--.

Signed and sealed this 9th day of April 1974.

(SEAL)
Attest:

EDWARD M. FLETCHER, JR.                C. MARSHALL DANN
Attesting Officer                      Commissioner of Patents